United States Patent
Longo et al.

(10) Patent No.: US 11,627,097 B2
(45) Date of Patent: Apr. 11, 2023

(54) CENTRALIZED QUALITY OF SERVICE MANAGEMENT

(71) Applicant: NetApp, Inc., Sunnyvale, CA (US)

(72) Inventors: Austino Longo, Lafayette, CO (US);
Christopher Cason, Boulder, CO (US);
Daniel McCarthy, Erie, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/187,336

(22) Filed: Feb. 26, 2021

(65) Prior Publication Data

US 2022/0278943 A1    Sep. 1, 2022

(51) Int. Cl.
*H04L 47/80*      (2022.01)
*H04L 43/0876*    (2022.01)
*H04L 67/1097*    (2022.01)
*H04L 67/125*     (2022.01)

(52) U.S. Cl.
CPC ........ *H04L 47/805* (2013.01); *H04L 43/0876* (2013.01); *H04L 67/1097* (2013.01); *H04L 67/125* (2013.01)

(58) Field of Classification Search
CPC ............. H04L 47/805; H04L 29/08549; H04L 43/0876
See application file for complete search history.

(56) References Cited

U.S. PATENT DOCUMENTS

| | | | |
|---|---|---|---|
| 6,711,129 B1 * | 3/2004 | Bauer | H04L 47/12 370/235 |
| 8,935,500 B1 * | 1/2015 | Gulati | G06F 11/3433 711/165 |
| 2010/0250831 A1 * | 9/2010 | O'Brien | G06F 11/3433 711/103 |
| 2013/0166727 A1 * | 6/2013 | Wright | G06F 3/0659 709/224 |
| 2014/0019579 A1 * | 1/2014 | Motwani | G06F 3/0614 709/216 |
| 2014/0047342 A1 * | 2/2014 | Breternitz | G06F 9/5061 715/735 |
| 2015/0160889 A1 * | 6/2015 | Beeson | G06F 3/0613 711/114 |
| 2017/0317895 A1 * | 11/2017 | Wright | G06F 3/0659 |

(Continued)

*Primary Examiner* — Mohamed A. Wasel
*Assistant Examiner* — Jihad K Boustany
(74) *Attorney, Agent, or Firm* — Jaffery Watson Mensonsa & Hamilton LLP

(57) ABSTRACT

Systems and methods for quality of service management are provided. According to one embodiment, a non-transitory computer-readable medium comprises instructions that when executed by the processing resource cause the processing resource to receive, in a normalizing agent, one or more compute load parameters from one or more background compute processes executing on the one or more computer systems and one or more Quality of Service (QoS) parameters for one or more client compute processes executing on the one or more computer systems, convert the one or more compute load parameters to one or more normalized utilization metrics, and execute instructions that cause a processor to adjust a compute resource allocation dedicated to the one or more background compute processes based at least in part on the one or more normalized utilization metrics and the one or more QoS parameters.

21 Claims, 6 Drawing Sheets

(56) References Cited

U.S. PATENT DOCUMENTS

| | | | |
|---|---|---|---|
| 2018/0241802 A1* | 8/2018 | Bernat | H04L 67/101 |
| 2019/0129750 A1* | 5/2019 | Liu | G06F 3/0673 |
| 2019/0166067 A1* | 5/2019 | Xu | H04L 43/0852 |

* cited by examiner

CENTRALIZED QUALITY OF SERVICE MANAGEMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, NetApp, Inc.

BACKGROUND

Field

Various embodiments of the present disclosure generally relate to data management in a data storage system. In particular, some embodiments relate to systems and techniques to implement centralized quality of service (QoS) management.

Description of the Related Art

Some data storage architectures store client data in a structure referred to as a volume. A client can access client data from a volume via one or more volume servers communicatively coupled to the volume. The volume servers can map the locations of the data specified by the client (e.g., file name, drive name, etc.) into unique identifiers that are specific to the location of the client data on the volume. Using the volume server as an interface to the volume allows the freedom to distribute data evenly over one or more volumes in a storage system. Managing distribution of data can be beneficial in terms of volume and system performance.

SUMMARY

Systems and methods are described for providing centralized quality of service (QoS) management are described and claimed. According to one embodiment, a method may be performed by one or more processing resources of one or more computer systems. The method comprises receiving, in a normalizing agent, one or more compute load parameters from one or more background compute processes executing on the one or more computer systems and one or more Quality of Service (QoS) parameters for one or more client compute processes executing on the one or more computer systems, converting the one or more compute load parameters to one or more normalized utilization metrics, and adjusting a compute resource allocation dedicated to the one or more background compute processes based at least in part on the one or more normalized utilization metrics and the one or more QoS parameters.

In another embodiment, a system comprises a processing resource and a non-transitory computer-readable medium, coupled to the processing resource, having stored therein instructions that when executed by the processing resource cause the processing resource to receive, in a normalizing agent, one or more compute load parameters from one or more background compute processes executing on the one or more computer systems and one or more Quality of Service (QoS) parameters for one or more client compute processes executing on the one or more computer systems, convert the one or more compute load parameters to one or more normalized utilization metrics, and execute instructions that cause a processor to adjust a compute resource allocation dedicated to the one or more background compute processes based at least in part on the one or more normalized utilization metrics and the one or more QoS parameters.

In another embodiment, a non-transitory computer-readable storage medium embodying a set of instructions, which when executed by a processing resource cause the processing resource to receive, in a normalizing agent, one or more compute load parameters from one or more background compute processes executing on the one or more computer systems and one or more Quality of Service (QoS) parameters for one or more client compute processes executing on the one or more computer systems, convert the one or more compute load parameters to one or more normalized utilization metrics, and execute instructions that cause a processor to adjust a compute resource allocation dedicated to the one or more background compute processes based at least in part on the one or more normalized utilization metrics and the one or more QoS parameters.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
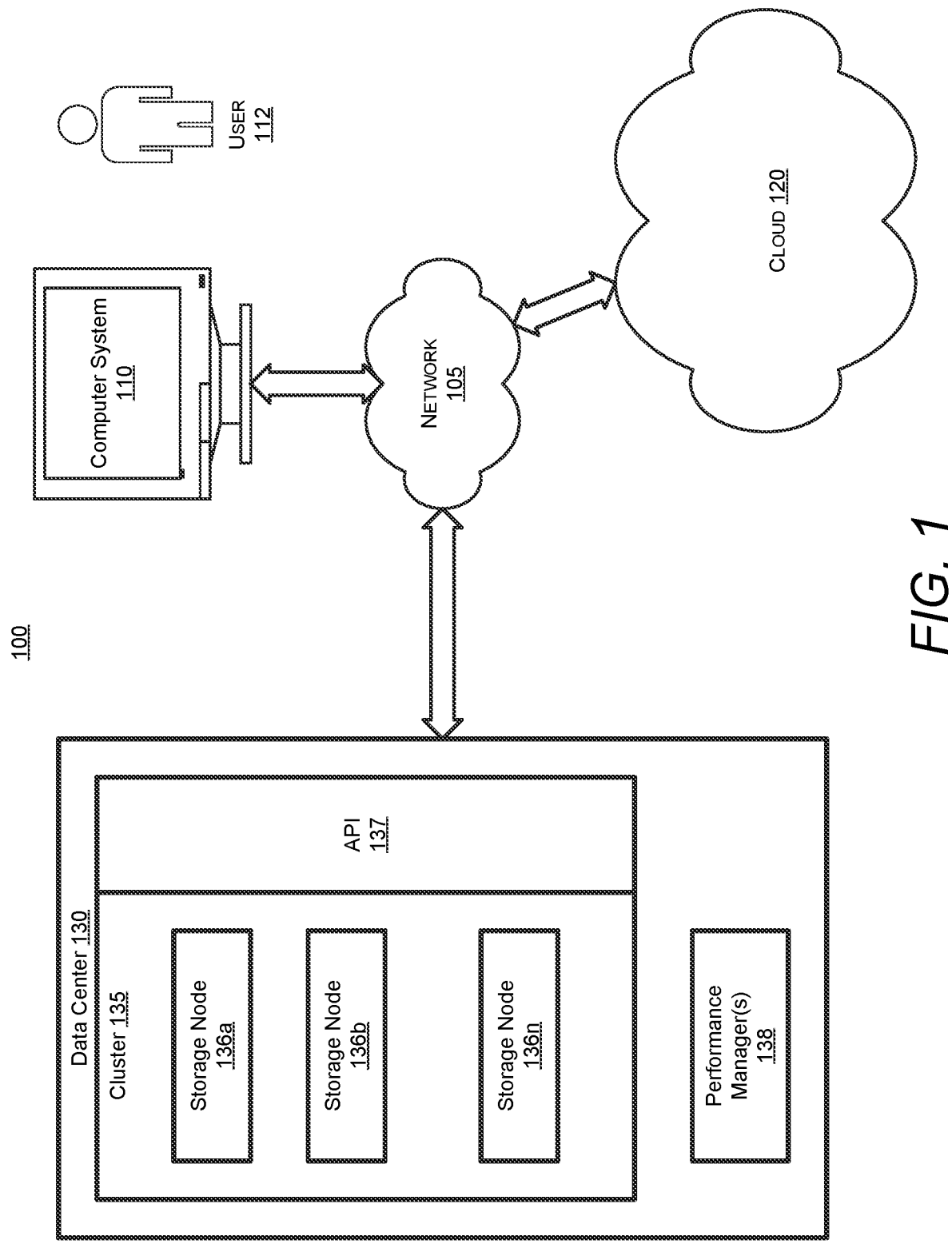
FIG. 1 is a block diagram illustrating a data processing environment in which various embodiments may be implemented.

Systems and methods are described for providing centralized quality of service (QoS) management of services in a distributed computing and/or storage system. In some instances, background compute processes (e.g., bin synchronization processes, slice balancing processes, fault monitoring processes and the like) can cause spikes in processor compute loads, which in turn can negatively impact QoS management for client services provided by the computing system. To address this and other issues, a normalizing agent which executes on one or more processors of the computer system collects various compute load parameters related to background processes executing on the computer system and generates normalized utilization metrics from the compute load parameters. The normalized utilization metrics may be used to adjust one or more operating parameters of the system to facilitate QoS management for client services. In some embodiments, a compute resource allocation dedicated to background compute processes may be adjusted. In other embodiments, background processes may throttle execution rates on their own (e.g., by delaying subsequent algorithm iterations for a period of time).

Various embodiments described herein seek to improve technological processes associated with managing compute resources in a distributed computer system. More particularly, embodiments described herein seek to improve on infrastructure and techniques to provide QoS management for client services in a distributed computing system.

Various embodiments of the present technology provide for a wide range of technical effects, advantages, and/or improvements to computing systems and components. For example, various embodiments may include one or more of the following technical effects, advantages, and/or improvements: 1) use of a centralized normalizing agent to collect compute load parameters from background processes to create an improvement to QoS services in a distributed computing environment; 2) use of unconventional and non-routine computer operations for the generation of normalized utilization metrics to gauge compute loads generated by background processes; and 3) the use of these normalized utilization metrics to dynamically manage compute resource allocation to background processes to facilitate QoS management of client processes thereby improving the QoS management.

According to one embodiment, a normalizing agent receives one or more compute load parameters from one or more background compute processes executing on the one or more computer systems and one or more Quality of Service (QoS) parameters for one or more client compute processes executing on the one or more computer systems, converts the one or more compute load parameters to one or more normalized utilization metrics, and adjusts a compute resource allocation dedicated to the one or more background compute processes based at least in part on the one or more normalized utilization metrics and the one or more QoS parameters.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

As used herein, "compute load parameters" generally refers to performance, configuration and/or other system data of a processing device. Non-limiting examples of compute load parameters for a distributed computing system include latency, utilization, a number of input output operations per second (IOPS), a slice service (SS) load, Quality of Service (QoS) settings, or any other performance related information.

As used herein, a "normalizing agent" generally refers to an entity which may be embodied in logic instructions executable on one or more processing devices to perform various data processing functions.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Data Processing Environment

FIG. 1 is a block diagram illustrating an environment 100 in which various embodiments may be implemented. In various embodiments described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on computer system 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a computer system 110, and a user 112. The data center 130, the cloud 120, and the computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a performance manager 138. Those of ordinary skill in the art will appreciate additional IT infrastructure would typically be part of the data center 130; however, discussion of such additional IT infrastructure is unnecessary to the understanding of the various embodiments described herein.

As illustrated in the embodiments shown in FIG. 1, the cluster 135 can include multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

Figure 2:
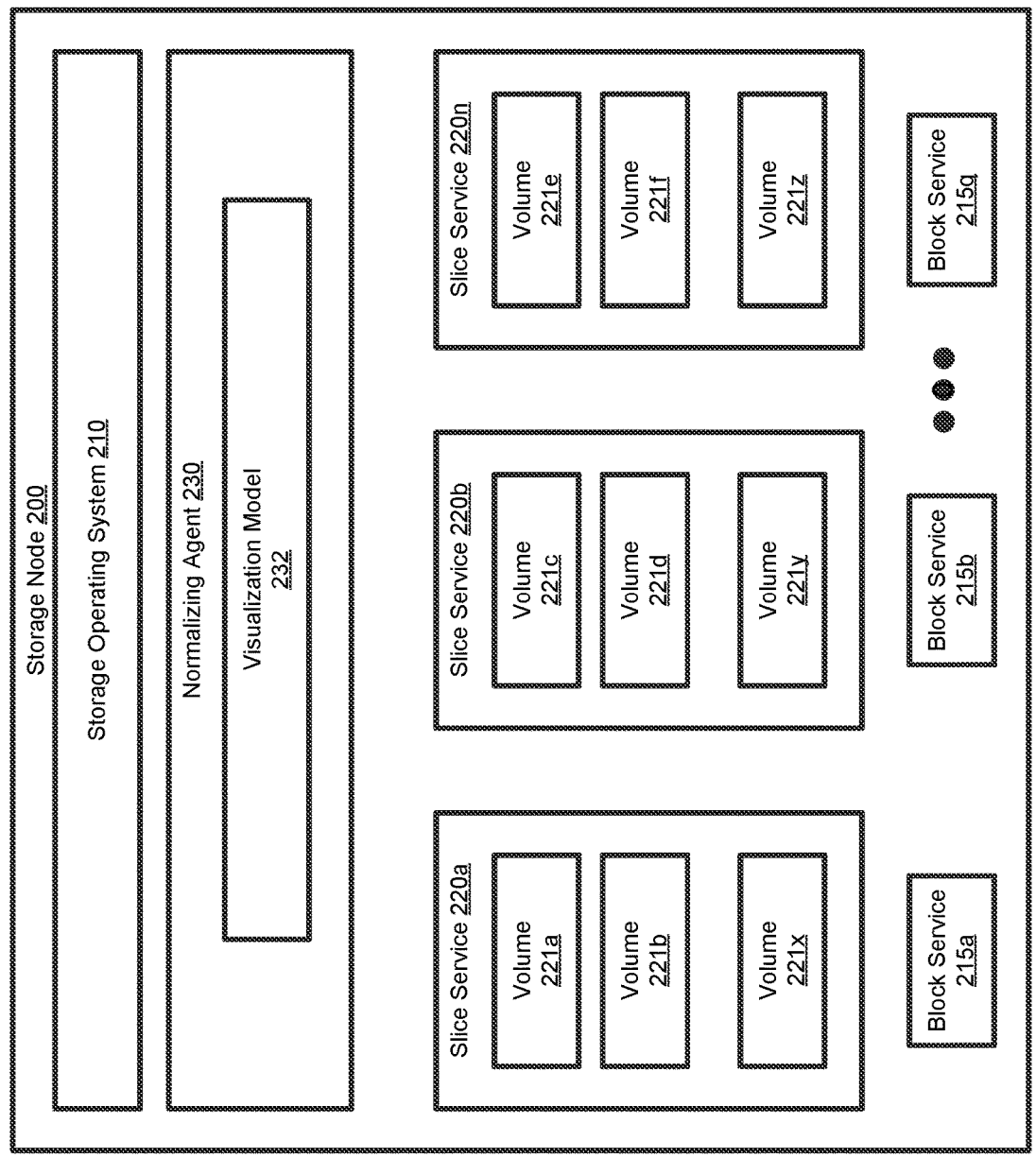
FIG. 2 is a block diagram illustrating a storage node in accordance with an embodiment of the present disclosure.

The API 137 may provide an interface through which the cluster 135 is configured and/or queried by external actors (e.g., the performance manager 138, the computer system 110, and a cloud-based, centralized normalizing agent (e.g., normalizing agent 230 shown in FIG. 2). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various embodiments, the storage node(s) 136a, 136b, 136n may comprise or be communicatively coupled to a performance manager 138. Performance manager 138 may be implemented locally within the same data center in which the cluster 135 resides as illustrated in FIG. 1. In other embodiments, performance manager 138 may be located external to cluster 135. Performance manager 138 can be configured to periodically poll and/or monitor for compute load parameters of the cluster 135 via the API 137. In some examples the polling may be performed on static periodic intervals. In other examples the polling interval may vary based upon one or more parameters (e.g., load, capacity, etc.). Depending upon the particular implementation, the polling may be performed at a predetermined or configurable interval (e.g., X milliseconds or Y seconds). The performance manager 138 may locally process and/or aggregate the collected compute load parameters (e.g., latency, utilization, IOPS, SS load, Quality of Service (QoS) settings, etc.) over a period of time by data point values and/or by ranges of data point values and provide frequency information regarding the aggregated compute load parameters retrieved from the cluster 135 to the normalizing agent 230.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Example Storage Node

FIG. 2 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

In some embodiments, the storage node 200 may comprise one or more centralized normalizing agents (e.g., normalizing agent 230). The normalizing agent 230 may receive (e.g., periodically, continuously, or on a set schedule) monitored information, including raw and/or processed compute load parameters (e.g., data representing aggregated compute load parameters over time) of multiple clusters (e.g., cluster 135 in FIG. 1) from multiple distributed performance managers (e.g., performance manager 138 in FIG. 1) operable within respective data centers (e.g., data center 130 in FIG. 1) of one or more customers of the managed service provider. Depending upon the particular implementation, the monitored information may be pushed from the performance manager 138 or pulled from the performance manager 138 in accordance with a monitoring schedule or responsive to an event (e.g., a request issued by user 112 to the normalizing agent 230).

In some examples aggregating compute load parameters may be accomplished by combining all the various compute load parameters into a single "load" parameter for use in determining how to throttle various subsystem processes. For example; a scale that measures between 0-100 may be used to represent latency, where 1 ms client latencies equate to a load of 50 on said scale. Such a parameter can then be aggregated with another compute load parameter, cache fullness, that is easily represented on a scale that represents the cache capacity (e.g., a 0-100% fullness scale).

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221*a*-*z* include unique and uniformly random identifiers to facilitate even distribution of a volume's data throughout a cluster (e.g., cluster 135). The slice services 220*a*-*n* may store metadata that maps between client systems and block services 215. For example, slice services 220*a*-*n* may map between the client addressing used by the client systems (e.g., file names, object names, block numbers, etc. such as Logical Block Addresses (LBAs)) and block layer addressing (e.g., block identifiers) used in block services 215. Further, block services 215*a*-*q* may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215*a*-*q* and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220*a*-*n* and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a performance manager module (e.g., performance manager 138 shown in FIG. 1) may poll an API (e.g., API 137 shown in FIG. 1) of a distributed storage system (e.g., cluster 135 shown in FIG. 1) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136*a*-*n*), individual or groups of volumes 221, individual or groups of slice services 220, and/or individual or groups of block services 215.

The storage nodes (e.g., storage nodes 136*a*-*n* and storage node 200), the performance manager (e.g., performance manager 138), and the monitoring system (e.g., normalizing agent 230) described herein, and the processing described below with reference to the flow diagram of FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 5, below.

Example Storage System

Figure 3A:
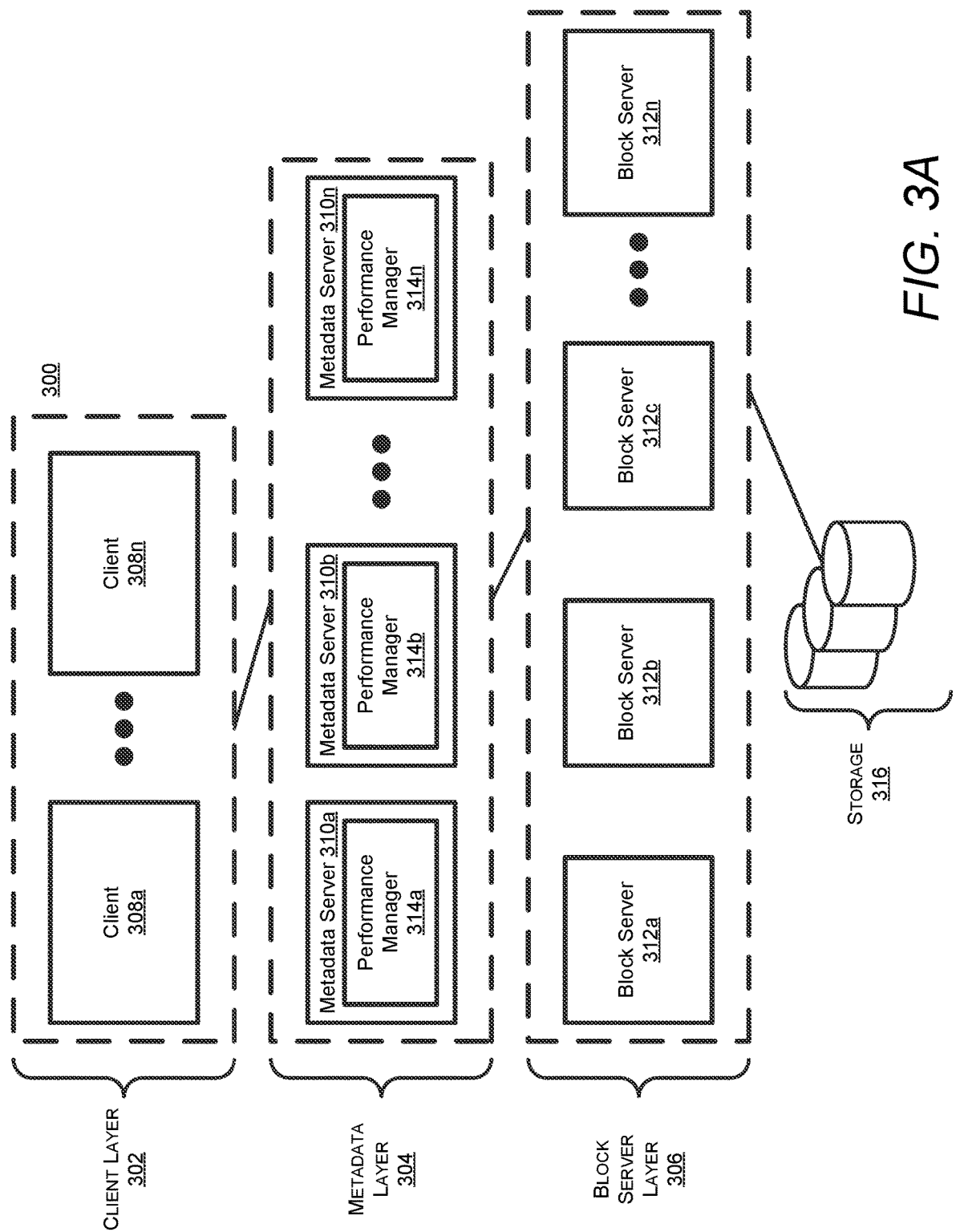
FIG. 3A is a block diagram of a storage system in accordance with an embodiment of the present disclosure.

FIG. 3A depicts a simplified system for centralized QoS management in a storage system 300 in accordance with an illustrative implementation. Storage system 300 includes a client layer 302, a metadata layer 304, a block server layer 306, and storage 316.

Before discussing how particular implementations perform centralized QoS management, the structure of a possible system is described. Client layer 302 includes one or more clients 308*a*-*n*. Clients 308*a*-*n* include client processes that may exist on one or more physical machines. When the term "client" is used in the disclosure, the action being performed may be performed by a client process. A client process is responsible for storing, retrieving, and deleting data in system 300. A client process may address pieces of data depending on the nature of the storage system and the format of the data stored. For example, the client process may reference data using a client address. The client address may take different forms. For example, in a storage system that uses file storage, each of clients 308*a*-*n* may reference a particular volume or partition, and a file name With object storage, the client address may be a unique object name. For block storage, the client address may be a volume or partition, and a block address. Clients 308*a*-*n* can communicate with metadata layer 304 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 304 includes one or more metadata servers 310*a*-*n*. Performance managers 314*a*-*n* may be located on metadata servers 310*a*-*n*. Block server layer 306 includes one or more block servers 312*a*-*n*. Block servers 312*a*-*n* are coupled to storage 316, which stores volume data for clients 308*a*-*n*. Each client 308*a*-*n* may be associated with a volume. In one implementation, only one client 308*a*-*n* may accesses data in a volume; however, multiple clients 308*a*-*n* may access data in a single volume.

Storage 316 can include multiple solid-state drives (SSDs). In one implementation, storage 316 can be a cluster of individual drives coupled together via a network. When the term "cluster" is used, it will be recognized that cluster may represent a storage system that includes multiple disks that may not be networked together. In one implementation, storage 316 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 316 is based upon breaking data up into one more storage units, e.g., data blocks. A data block, therefore, is the raw data for a volume and may be the smallest addressable unit of data. The metadata layer 304 or the client layer 302 can break data into data blocks. The data blocks can then be stored on multiple block servers 312a-n. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 302 and/or metadata layer 304. Also, compression may occur in client layer 302, metadata layer 304, and/or block server layer 306.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved since data for each client is spread evenly through the drives. Accordingly, a client's I/O will involve all the drives in the cluster. Since all clients have their data spread substantially evenly through all the drives in the storage system, a performance of the system can be described in aggregate as a single number, e.g., the sum of performance of all the drives in the storage system.

Block servers 312a-n and slice servers 324 (FIG. 3B) maintain a mapping between a block identifier and the location of the data block in a storage medium of block server 312. A volume includes these unique and uniformly random identifiers, and so a volume's data is also evenly distributed throughout the cluster.

Metadata layer 304 stores metadata that maps between client layer 302 and block server layer 306. For example, metadata servers 310 map between the client addressing used by one or more clients 308a . . . nn (e.g., file names, object names, block numbers, etc.) and block layer addressing (e.g., block identifiers) used in block server layer 306. Clients 308a . . . n may perform access based on client addresses. However, as described above, block servers 312 store data based upon identifiers and do not store data based on client addresses. Accordingly, a client can access data using a client address which is eventually translated into the corresponding unique identifiers that reference the client's data in storage 316.

Although the parts of system 300 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 310 may be combined with one or more block servers 312 in a single machine. Entities in system 300 may be virtualized entities. For example, multiple virtual block servers 312 may be included on a machine. Entities may also be included in a cluster, where computing resources of the cluster are virtualized such that the computing resources appear as a single entity.

Figure 3B:
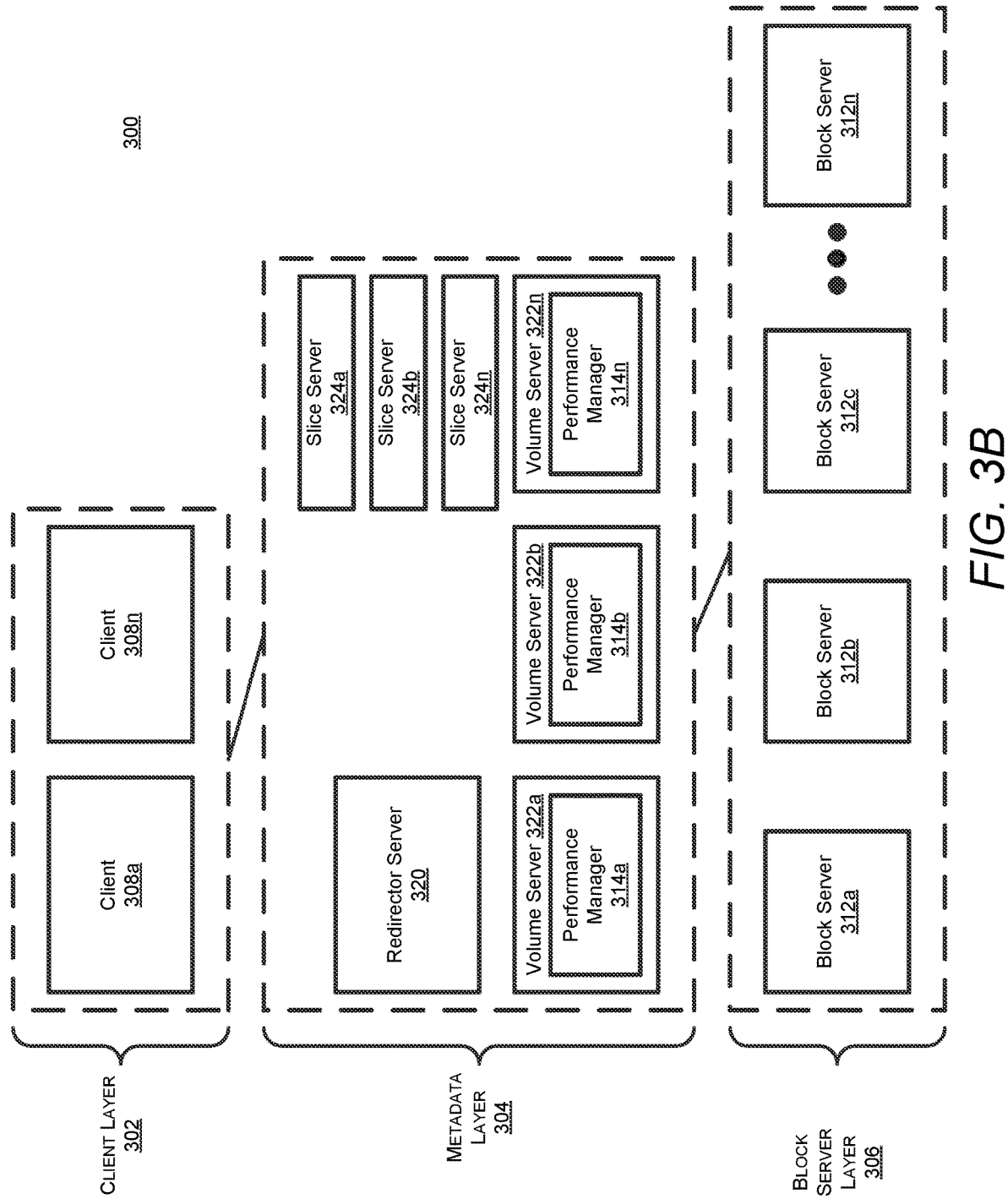
FIG. 3B is a more detailed block diagram of a storage system in accordance with an embodiment of the present disclosure

FIG. 3B depicts a more detailed example of system 300 according to one implementation. Metadata layer 304 may include a redirector server 320 and multiple volume servers 322. Each volume server 322 may be associated with a plurality of slice servers 324.

In this example, client 308a wants to connect to a volume (e.g., client address). Client 308a communicates with redirector server 320, identifies itself by an initiator name, and also indicates a volume by target name that client 308a wants to connect to. Different volume servers 322 may be responsible for different volumes. In this case, redirector server 320 is used to redirect the client to a specific volume server 322. To client 308, redirector server 320 may represent a single point of contact. The first request from client 308a then is redirected to a specific volume server 322. For example, redirector server 320 may use a database of volumes to determine which volume server 322 is a primary volume server for the requested target name. The request from client 308a is then directed to the specific volume server 322 causing client 308a to connect directly to the specific volume server 322. Communications between client 308a and the specific volume server 322 may then proceed without redirector server 320.

Volume server 322 performs functions as described with respect to metadata server 310. Additionally, each volume server 322 includes a performance manager 314. For each volume hosted by volume server 322, a list of block identifiers is stored with one block identifier for each logical block on the volume. Each volume may be replicated between one or more volume servers 322 and the metadata for each volume may be synchronized between each of the volume servers 322 hosting that volume. If a volume server 322a . . . n fails, redirector server 320 may direct a client 308a . . . n to an alternate volume server 322a . . . n.

In one implementation, the metadata being stored on volume server 322 may be too large for one volume server 322. Thus, multiple slice servers 324 may be associated with each volume server 322. The metadata may be divided into slices and a slice of metadata may be stored on each slice server 324. When a request for a volume is received at volume server 322, volume server 322 determines which slice server 324 contains metadata for that volume. Volume server 322 then routes the request to the appropriate slice server 324. Accordingly, slice server 324 adds an additional layer of abstraction to volume server 322.

The above structure allows storing of data evenly across the cluster of disks. For example, by storing data based on block identifiers, data can be evenly stored across drives of a cluster. As described above, data evenly stored across the cluster allows for performance metrics to manage load in system 300. If the system 300 is under a load, clients can be throttled or locked out of a volume. When a client is locked out of a volume, metadata server 310 or volume server 322 may close the command window or reduce or zero the amount of read or write data that is being processed at a time for a client 308a . . . n. The metadata server 310 or the volume server 322a . . . n can queue access requests for client 308a . . . n, such that IO requests from the client 308a . . . n can be processed after the client's access to the volume resumes after the lock out period.

In some examples, the storage system 300 can also include one or more performance managers 314a . . . n that can monitor the use of the storage system's resources by both client processes and background processes. In addition, a performance manager 314a . . . n can facilitate regulating use of the storage system 300 by both client processes and background processes. The use of the storage system can be adjusted based upon performance metrics, the client's quality of service parameters, and the load of the storage system. Performance metrics are various measurable attributes of the storage system. One or more performance metrics can be used to determine load parameters of the system, which, as described in greater detail below, can be used to throttle clients of the system.

Performance metrics can be grouped in different categories of metrics. System metrics is one such category. System metrics are metrics that reflect the use of the system or components of the system by all clients. System metrics can include metrics associated with the entire storage system or with components within the storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined for at the system level, service level, and the node level. Other examples of system metrics include measured or aggregated metrics such as read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients 308 and the volume of data. Read latency can be the time taken for the system 300 to read data from a volume and return the data to a client. Write latency can be the time taken for the system to write data and return a success indicator to the client. Workload type can indicate if IO access is sequential or random. The data type can identify the type of data being accessed/written, e.g., text, video, images, audio, etc. The write cache capacity refers to a write cache of a node, a block server, or a volume server. The write cache is relatively fast memory that is used to store data before it is written to storage 316. As noted above, each of these metrics can be independently calculated for the system, a cluster, a node, etc. In addition, these values can also be calculated at a client level.

Client metrics are another category of metrics that can be calculated. Unlike system metrics, client metrics are calculated taking into account the client's use of the system. As described in greater detail below, a client metric may include use by other client's that are using common features of the system. Client metrics, however, will not include use of non-common features of the system by other clients. In one implementation, client metrics can include the same metrics as the system metrics, but rather than being component or system wide, are specific to a volume of the client. For example, metrics such as read latency or write IOPS can be monitored for a particular volume of a client.

Background process metrics is another category of metrics that can be calculated. Background process metrics include metrics associated with background processes executed by the system. Examples of background processes include bin synchronization processes, slice balancing process, slice synchronization processes, cluster fault monitoring processes, and the like.

Metrics, including system metrics, background process metrics, and client metrics, can be calculated over a period of time (e.g., 250 ms, 500 ms, 1 s, etc). Accordingly, different statistical values (e.g., a min, max, standard deviation, average, etc.) can be calculated for each metric. One or more of the metrics can be used to calculate a value that represents one or more compute load parameters of the storage system. Load parameters can be calculated for the entire storage system, for individual components, for individual services, and/or individual clients. Compute load parameter values (e.g., system load values and/or client load values) can then be used by the normalizing agent 230 to determine if and how various processes should be managed (i.e., throttled) to achieve QoS goals for particular client processes.

As described in greater detail below, compute resource allocation for background processes can be adjusted based upon the compute load parameters. For example, based on a number of factors, such as system metrics, client metrics, background process metrics, and client quality of service parameters, a computer resource allocation dedicated to one or more background compute processes may be adjusted, e.g., to achieve a target QoS parameter associate with a client system.

Centralized QoS Management Processing

Figure 4:
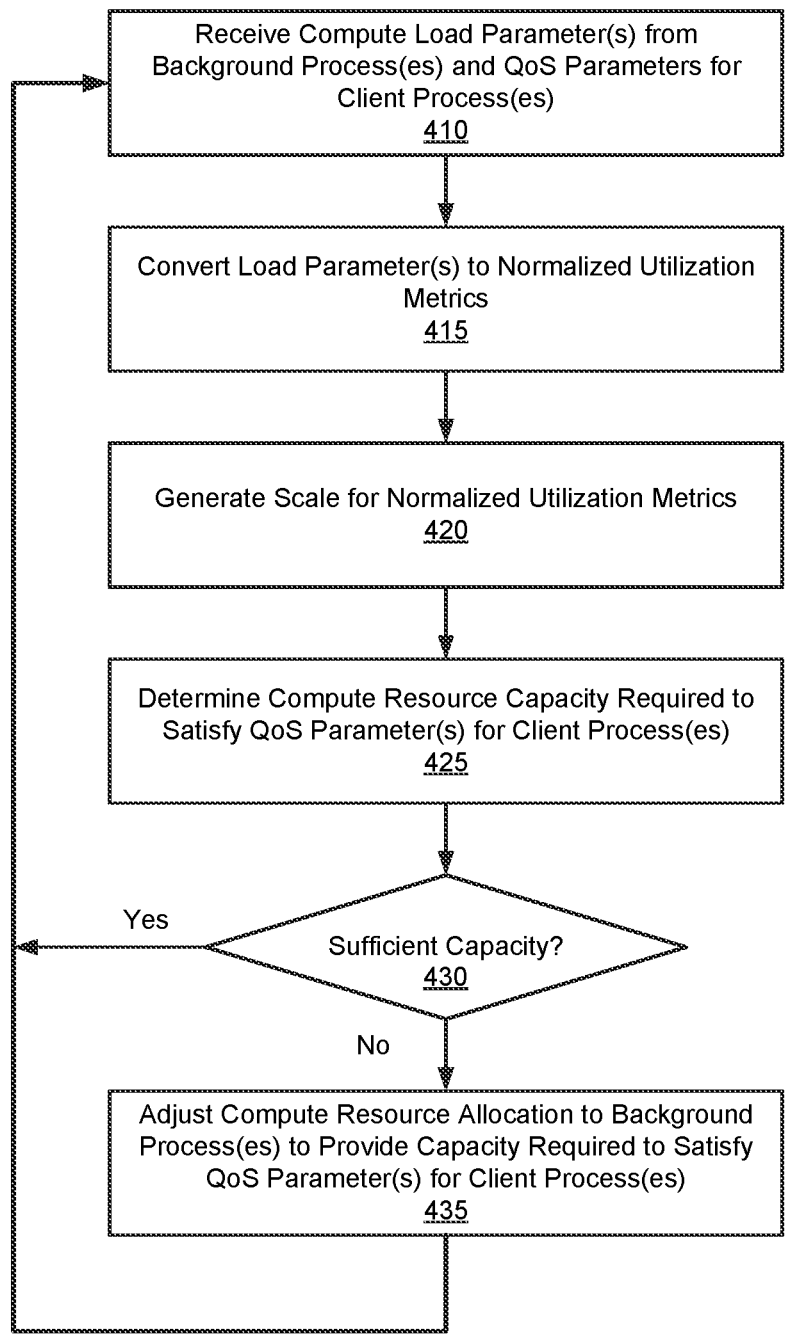
FIG. 4 is a flow diagram illustrating operations in a technique to implement centralized quality of service (QoS) management in accordance with an embodiment of the present disclosure.

FIG. 4 is a flow diagram illustrating operations in a technique to implement centralized quality of service (QoS) management in accordance with an embodiment of the present disclosure. Depending upon the particular implementation some portion or all of the distribution visualization processing may be performed by a centralized normalizing agent (e.g., normalizing agent 230) and/or a remote administrative station (e.g., computer system 110).

Referring to FIG. 4, at operation 410, compute load parameters from one or more background compute processes and one or more QoS parameters for one or more client processes are received. As described above, in some examples background compute load parameters may be received from the performance manager(s) operating at the metadata layer of the system 300.

At operation 415, the compute load parameters are converted to normalized utilization metrics. In some embodiments, the compute load parameters may be converted to represent a percentage of usage of the one or more central processing units (CPUs) of the computer system 110. In other embodiments, the compute load parameters may be converted to represent a measure of I/O throughput of the system 300. In other embodiments, the compute load parameters may be converted to represent a measure of random-access memory (RAM) consumption. In some embodiments normalized utilization metrics can be compared across different system components.

At operation 420, a scale is generated for the normalized utilization metrics. In some embodiments, the scale may be an absolute scale that ranges from a lower limit (e.g., zero) to an upper limit (e.g., 100). In some embodiments, the scale may be graded to indicate acceptable levels of operation associated with the normalized utilization metrics, questionable levels of operation, and unacceptable levels of operation. In some implementations QoS defines the three ranges (on a scale of 0-100): Acceptable: 0-37, Questionable: 38-60, Unacceptable: 61-100. However, the particular ranges are not fixed and may be adjusted based on operating conditions. The normalized utilization metrics calculated in operation 415 may be categorized into one of the grade levels of the scale and the grade level may be presented on a suitable user interface.

At operation 425, a compute resource capacity required to satisfy one or more QoS parameters associated with one or more client processes is determined. In some embodiments, the operating system may be queried to obtain the current CPU utilization of the process. In some embodiments, the QoS parameter may be expressed directly as a percentage of usage of the one or more central processing units (CPUs) of the computer system 110. In other embodiments, the QoS parameters may be expressed a measure of I/O throughput of the system 300. The QoS parameters may be static parameters associated with a client process or may be dynamic levels which vary in response to one or more parameters. For example, a particular client process may be guaranteed a first specific set of QoS parameters during a first window of time and a second set of QoS parameter during a second window of time. The required QoS parameters associated with client processors may be stored in a suitable computer-readable memory in logical association with an identifier for the client.

At operation 430 it is determined whether the normalized utilization metrics for the existing system configuration that were determined in operation 415 leave sufficient resource capacity in the system to satisfy the resource capacity required to satisfy the QoS parameters for the client process(es) executing on the system. In some embodiments, the normalized utilization metrics may be subtracted from the system capacity to determine the available system capacity. If the available system capacity is adequate to satisfy the QoS parameters for client processes, then operation can revert to block 410 and another round of compute load parameters is received.

By contrast, if during operation 430 it is determined that the available system capacity is not adequate to satisfy the QoS parameters for client processes, then operation passes to operation 435 and a compute resource allocation to one or more background processes may be adjusted (e.g., throttled) to provide additional capacity required to satisfy the QoS parameters for client processes. In some embodiments, one or more background processes may be forced to yield at least a portion of the CPU time allocated to the process for a specified amount of time. This allows the CPU time to be reallocated to a client process.

Thus, the operations defined in FIG. 4 define a process by which the normalizing agent 230 may monitor operating conditions and load parameters of a system 300 and periodically adjust compute resources allocated to background processes in an effort to satisfy compute resource requirements associated with client processes.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 5:
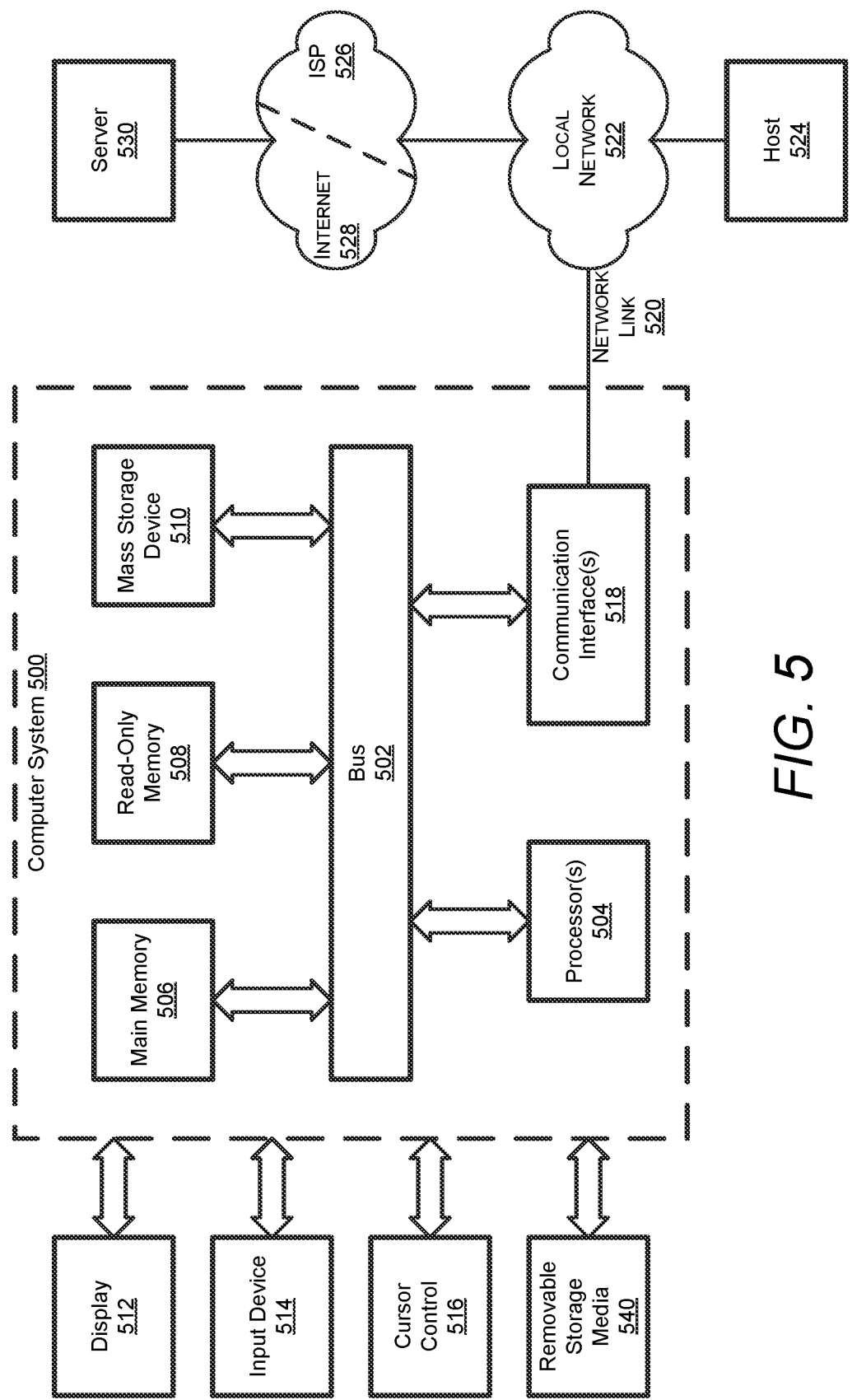
FIG. 5 illustrates an example computer system in which or with which embodiments of the present disclosure may be utilized.

FIG. 5 is a block diagram that illustrates a computer system 500 in which or with which an embodiment of the present disclosure may be implemented. Computer system 500 may be representative of all or a portion of the computing resources associated with a storage node (e.g., storage node 136), a performance manager (e.g., performance manager 138), a monitoring system (e.g., monitoring system 230) or an administrative workstation (e.g., computer system 110). Notably, components of computer system 500 described herein are meant only to exemplify various possibilities. In no way should example computer system 500 limit the scope of the present disclosure. In the context of the present example, computer system 500 includes a bus 502 or other communication mechanism for communicating information, and a processing resource (e.g., a hardware processor 504) coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, e.g., a magnetic disk, optical disk or flash disk (made of flash memory chips), is provided and coupled to bus 502 for storing information and instructions.

Computer system 500 may be coupled via bus 502 to a display 512, e.g., a cathode ray tube (CRT), Liquid Crystal Display (LCD), Organic Light-Emitting Diode Display (OLED), Digital Light Processing Display (DLP) or the like, for displaying information to a computer user. An input device 514, including alphanumeric and other keys, is coupled to bus 502 for communicating information and command selections to processor 504. Another type of user input device is cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Removable storage media 540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 510. Volatile media includes dynamic memory, such as main memory 506. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

What is claimed is:

1. A method performed by one or more processing resources of one or more computer systems, the method comprising:

receiving, in a normalizing agent, one or more compute load parameters aggregated over time from one or more background compute processes executing on the one or more computer systems and one or more Quality of Service (QoS) parameters for one or more client compute processes executing on the one or more computer systems;

converting the one or more compute load parameters to one or more normalized utilization metrics;

generating a scale for the one or more normalized utilization metrics, wherein the scale defines a range of compute resource utilization consumed by the one or more background compute processes;

determining, based on the scale, adequacy of resource capacity in the system to satisfy the QoS parameters for the client compute processes executing on the system; and adjusting a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

2. The method of claim 1, wherein the one or more background compute processes comprises
at least one of a bin synchronization process, a slice balancing process, or a cluster fault monitoring process.

3. The method of claim 1, wherein the one or more normalized utilization metrics comprises
at least one of a percentage of processor utilization metric or an input/output (I/O) throughput metric.

4. The method of claim 1, wherein the scale is graded to indicate acceptable levels of operation associated with the normalized utilization metrics.

5. The method of claim 4, further comprising
determining a compute resource capacity required to satisfy the one or more QoS parameters for one or more client compute processes executing on the one or more computer systems.

6. The method of claim 5, further comprising
adjusting a compute resource allocation dedicated to the one or more background compute processes to provide a capacity required to satisfy the one or more Quality of Service (QoS) parameters.

7. The system of claim 6, wherein the non-transitory computer-readable medium having stored therein instructions that when executed by the processing resource cause the processing resource to:
guarantee, to at least one of the client compute processes, a first set of QoS parameters during a first window of time; and
a second set of QoS parameters during a second window of time.

8. The method of claim 1, further comprising:
guaranteeing, to at least one of the client compute processes, a first set of QoS parameters during a first window of time; and
a second set of QoS parameters during a second window of time.

9. The method of claim 1, further comprising:
determining available system capacity by subtracting the normalized utilization metrics from the system capacity.

10. The method of claim 9, further comprising:
receiving another round of compute load parameters if the available system capacity is adequate to satisfy the QoS parameters for client processes.

11. A system comprising:
a processing resource; and
a non-transitory computer-readable medium, coupled to the processing resource, having stored therein instructions that when executed by the processing resource cause the processing resource to:
receive, in a normalizing agent, one or more compute load parameters aggregated over time from one or more background compute processes executing on the one or more computer systems and one or more Quality of Service (QoS) parameters for one or more client compute processes executing on the one or more computer systems;
convert the one or more compute load parameters to one or more normalized utilization metrics;
generate a scale for the one or more normalized utilization metrics, wherein the scale defines a range of compute resource utilization consumed by the one or more background compute processes;
determine, based on the scale, adequacy of resource capacity in the system to satisfy the QoS parameters for the client compute processes executing on the system; and
execute instructions that cause the processing resource to adjust a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

12. The system of claim 11, wherein the one or more background compute processes comprises
at least one of a bin synchronization process, a slice balancing process, or a cluster fault monitoring process.

13. The system of claim 11, wherein the one or more normalized utilization metrics comprises
at least one of a percentage of processor utilization metric or an input/output (I/O) throughput metric.

14. The system of claim 11, the non-transitory computer-readable medium having stored therein instructions that when executed by the processing resource cause the processing resource to
grade the scale to indicate acceptable levels of operation associated with the normalized utilization metrics.

15. The system of claim 14, the non-transitory computer-readable medium having stored therein instructions that when executed by the processing resource cause the processing resource to
determine a compute resource capacity required to satisfy the one or more QoS parameters for one or more client compute processes executing on the one or more computer systems.

16. The system of claim 15, the non-transitory computer-readable medium having stored therein instructions that when executed by the processing resource cause the processing resource to
adjust a compute resource allocation dedicated to the one or more background compute processes to provide a capacity required to satisfy the one or more Quality of Service (QoS) parameters.

17. A system comprising:
a processor;
a memory storing one or more instructions, when executed by the processor, causing a normalizing agent to:
receive one or more compute load parameters aggregated over time from one or more background compute processes executing on the one or more computer systems and one or more Quality of Service (QoS) parameters for one or more client compute processes executing on the one or more computer systems; convert the one or more compute load parameters to one or more normalized utilization metrics;
generate a scale for the one or more normalized utilization metrics, wherein the scale defines a range of compute resource utilization consumed by the one or more background compute processes;
determine, based on the scale, adequacy of resource capacity in the system to satisfy the QoS parameters for the client compute processes executing on the system; and
adjust a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

18. The system of claim 17, wherein the one or more normalized utilization metrics comprises
at least one of a percentage of processor utilization metric or an input/output (I/O) throughput metric.

19. The system of claim 17, wherein the normalizing agent is further to
grade the scale to indicate one of an acceptable level, a questionable level and an unacceptable level of operation associated with the normalized utilization metrics.

20. The system of claim 19, wherein the normalizing agent is further to
determine a compute resource capacity required to satisfy the one or more QoS parameters for one or more client compute processes executing on the one or more computer systems.

21. The system of claim 17, wherein the normalizing agent is further to:
guarantee, to at least one of the client compute processes,
a first set of QoS parameters during a first window of time; and
a second set of QoS parameters during a second window of time.

* * * * *

UNITED STATES PATENT AND TRADEMARK OFFICE
CERTIFICATE OF CORRECTION

PATENT NO. : 11,627,097 B2
APPLICATION NO. : 17/187336
DATED : April 11, 2023
INVENTOR(S) : Longo et al.

It is certified that error appears in the above-identified patent and that said Letters Patent is hereby corrected as shown below:

In the Claims

Replace Column 16, Line 65-Column 20, Line 25, (approx.) with the following Claims:

1. A method performed by one or more processing resources of one or more computer systems, the method comprising:
    receiving, in a normalizing agent, one or more compute load parameters aggregated over time from one or more background compute processes executing on the one or more computer systems and one or more Quality of Service (QoS) parameters for one or more client compute processes executing on the one or more computer systems;
    converting the one or more compute load parameters to one or more normalized utilization metrics; generating a scale for the one or more normalized utilization metrics, wherein the scale defines a range of compute resource utilization consumed by the one or more background compute processes;
    determining, based on the scale, adequacy of resource capacity in the system to satisfy the QoS parameters for the client compute processes executing on the system; and
    adjusting a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

2. The method of claim 1, wherein the one or more background compute processes comprises at least one of a bin synchronization process, a slice balancing process, or a cluster fault monitoring process.

3. The method of claim 1, wherein the one or more normalized utilization metrics comprises at least one of a percentage of processor utilization metric or an input/output (I/O) throughput metric.

Signed and Sealed this
Sixth Day of February, 2024

Katherine Kelly Vidal
*Director of the United States Patent and Trademark Office*

4. The method of claim 1, wherein the scale is graded to indicate acceptable levels of operation associated with the normalized utilization metrics.

5. The method of claim 4, further comprising determining a compute resource capacity required to satisfy the one or more QoS parameters for one or more client compute processes executing on the one or more computer systems.

6. The method of claim 5, further comprising adjusting a compute resource allocation dedicated to the one or more background compute processes to provide a capacity required to satisfy the one or more Quality of Service (QoS) parameters.

7. The method of claim 1, further comprising: guaranteeing, to at least one of the client compute processes, a first set of QoS parameters during a first window of time; and a second set of QoS parameters during a second window of time.

8. The method of claim 1, further comprising: determining available system capacity by subtracting the normalized utilization metrics from the system capacity.

9. The method of claim 8, further comprising: receiving another round of compute load parameters if the available system capacity is adequate to satisfy the QoS parameters for client processes.

10. A system comprising:
    a processing resource; and
    a non-transitory computer-readable medium, coupled to the processing resource, having stored therein instructions that when executed by the processing resource cause the processing resource to:
        receive, in a normalizing agent, one or more compute load parameters aggregated over time from one or more background compute processes executing on the one or more computer systems and one or more Quality of Service (QoS) parameters for one or more client compute processes executing on the one or more computer systems;
        convert the one or more compute load parameters to one or more normalized utilization metrics; generate a scale for the one or more normalized utilization metrics, wherein the scale defines a range of compute resource utilization consumed by the one or more background compute processes;
        determine, based on the scale, adequacy of resource capacity in the system to satisfy the QoS parameters for the client compute processes executing on the system; and
        execute instructions that cause the processing resource to adjust a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

11. The system of claim 10, wherein the one or more background compute processes comprises at least one of a bin synchronization process, a slice balancing process, or a cluster fault monitoring process.

12. The system of claim 10, wherein the one or more normalized utilization metrics comprises at least one of a percentage of processor utilization metric or an input/output (I/O) throughput metric.

13. The system of claim 10, wherein the non-transitory computer-readable medium having stored therein instructions that when executed by the processing resource cause the processing resource to: guarantee, to at least one of the client compute processes, a first set of QoS parameters during a first window of time; and a second set of QoS parameters during a second window of time.

14. The system of claim 10, the non-transitory computer-readable medium having stored therein instructions that when executed by the processing resource cause the processing resource to grade the scale to indicate acceptable levels of operation associated with the normalized utilization metrics.

15. The system of claim 14, the non-transitory computer-readable medium having stored therein instructions that when executed by the processing resource cause the processing resource to determine a compute resource capacity required to satisfy the one or more QoS parameters for one or more client compute processes executing on the one or more computer systems.

16. The system of claim 15, the non-transitory computer-readable medium having stored therein instructions that when executed by the processing resource cause the processing resource to adjust a compute resource allocation dedicated to the one or more background compute processes to provide a capacity required to satisfy the one or more Quality of Service (QoS) parameters.

17. A system comprising:
    a processor;
    a memory storing one or more instructions, when executed by the processor, causing a normalizing agent to:
        receive one or more compute load parameters aggregated over time from one or more background compute processes executing on the one or more computer systems and one or more Quality of Service (QoS) parameters for one or more client compute processes executing on the one or more computer systems;
        convert the one or more compute load parameters to one or more normalized utilization metrics;
        generate a scale for the one or more normalized utilization metrics, wherein the scale defines a range of compute resource utilization consumed by the one or more background compute processes;
        determine, based on the scale, adequacy of resource capacity in the system to satisfy the QoS parameters for the client compute processes executing on the system; and
        adjust a compute resource allocation dedicated to the one or more background compute processes based at least in part on the scale and the one or more QoS parameters, wherein the adjusting comprises the one or more background processes yielding at least a portion of CPU time allocated to the background process for a specified amount of time.

18. The system of claim 17, wherein the one or more normalized utilization metrics comprises at least one of a percentage of processor utilization metric or an input/output (I/O) throughput metric.

19. The system of claim 17, wherein the normalizing agent is further to grade the scale to indicate one of an acceptable level, a questionable level and an unacceptable level of operation associated with the normalized utilization metrics.

20. The system of claim 19, wherein the normalizing agent is further to determine a compute resource capacity required to satisfy the one or more QoS parameters for one or more client compute processes executing on the one or more computer systems.

21. The system of claim 17, wherein the normalizing agent is further to: guarantee, to at least one of the client compute processes, a first set of QoS parameters during a first window of time; and a second set of QoS parameters during a second window of time.